US012811686B2

(12) United States Patent
Jiang et al.

(10) Patent No.: US 12,811,686 B2
(45) Date of Patent: Nov. 24, 2026

(54) METHOD AND DEVICE FOR DEMODULATING DATA MODULATED BY AMPLITUDE MODULATION OF A LIGHT SIGNAL EMITTED BY A LIGHT SOURCE OF A TRANSMITTER DEVICE

(71) Applicant: Schneider Electric Industries SAS, Rueil-Malmaison (FR)

(72) Inventors: Lei Jiang, Saint Martin d'Heres (FR); Fabien Hermitte, Meylan (FR); Emmanuel Dreina, Meylan (FR); Jean-Louis Lovato, Biviers (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 140 days.

(21) Appl. No.: 18/954,784

(22) Filed: Nov. 21, 2024

(65) Prior Publication Data

US 2025/0175252 A1 May 29, 2025

(30) Foreign Application Priority Data

Nov. 24, 2023 (FR) ....................................... 2312985

(51) Int. Cl.
*H04B 10/69* (2013.01)
*H04B 10/114* (2013.01)
(Continued)

(52) U.S. Cl.
CPC ......... *H04B 10/116* (2013.01); *H04B 10/114* (2013.01); *H04B 10/60* (2013.01); *H04B 10/69* (2013.01)

(58) Field of Classification Search
CPC ............ H04B 10/11–116; H04B 10/60; H04B 10/69; H04B 10/114
(Continued)

(56) References Cited

U.S. PATENT DOCUMENTS 8,346,497 B2 * 1/2013 Miyairi .............. H10D 86/0229 702/183
2015/0188632 A1 * 7/2015 Aoyama .............. H04B 10/116 398/118
(Continued)

OTHER PUBLICATIONS

Liu et al., "A Frame Averaging based Signal Tracing (Fast) Algorithm for Optical Camera Communications", 2018 Asia Communications and Photonics Conference (ACP), IEEE, Oct. 26, 2018, 3 pages (Year: 2018).*
(Continued)

*Primary Examiner* — Li Liu
(74) *Attorney, Agent, or Firm* — Kinney & Lange, P.A.

(57) ABSTRACT

The present demodulation device acquires a digital image including a zone illuminated by a light signal emitted by a source. Same is configured to:

calculate (24) and store a mean value per column of said digital image, in association with a column index, arranged between a first and a second edge index of the image;

determine (26) a maximum value of said mean values, and calculate a threshold from said maximum value, determine (28) of a first column index corresponding to the first mean value greater than or equal to said threshold starting from the first edge index, and of a second column index corresponding to the first mean value greater than or equal to said threshold starting from the second edge index;

demodulate (30, 32) binary data from the mean values between the first column index and the second column index.

9 Claims, 4 Drawing Sheets

(51) Int. Cl.
*H04B 10/116* (2013.01)
*H04B 10/60* (2013.01)

(58) Field of Classification Search
USPC .................................. 398/118–131, 202, 208
See application file for complete search history.

(56) References Cited

U.S. PATENT DOCUMENTS

2017/0075357 A1* 3/2017 MacNeille ................ G01S 1/00
2025/0158710 A1* 5/2025 Archenhold ....... H04B 10/1149

OTHER PUBLICATIONS

Liu, Liqiong et al., "A Frame Averaging based Signal Tracing (Fast) Algorithm for Optical Camera Communications", 2018 Asia Communications and Photonics Conference (ACP), IEEE, Oct. 26, 2018, 3 pages.
French Search Report dated Jun. 6, 2024 for corresponding French Patent Application No. 2312985, 1 page.

* cited by examiner

METHOD AND DEVICE FOR DEMODULATING DATA MODULATED BY AMPLITUDE MODULATION OF A LIGHT SIGNAL EMITTED BY A LIGHT SOURCE OF A TRANSMITTER DEVICE

This application claims priority to French Patent Application No. 2312985 filed Nov. 24, 2023, the entire disclosure of which is incorporated by reference herein.

FIELD OF THE INVENTION

The invention relates to a method for demodulating data modulated by amplitude modulation of a light signal emitted by a light source of a transmitter device. The invention further relates to an associated demodulation device and an associated electronic device.

The invention is in the field of wireless communication technology using visible light, using a VLC (Visible Light Communication) system.

BACKGROUND OF THE INVENTION

The invention applies more particularly within the framework of data communication using an encoder/transmitter implemented on industrial products including on the front a light indicator with light emitting diodes (LEDs), e.g. a screen or one or a plurality of light indicators, intended to provide indications on a state of the product, the data being decodable by a VLC receiver/decoder, integrated e.g. in a portable device, e.g. a mobile phone.

For example, the invention applies to products for monitoring and protecting electrical systems, but more generally applies to any type of product including a light indicator on the front.

The use of wireless communication technology by means of visible light, also called VLC, has recently developed and found many applications.

A VLC system includes an encoder/transmitter device and a receiver/decoder device positioned substantially opposite each other. The encoder/emitter device includes a light source, e.g. one or a plurality of light-emitting diode (LED) lamps, and the receiver/decoder device includes an image sensor apparatus, e.g. a CMOS camera.

The light source emits a light signal which is amplitude-modulated according to data to be transmitted, the data being coded into symbols by a coding method, each symbol being representative of a bit to be modulated. The symbols are then encapsulated in formatted transmission packets to form a bitstream including a predetermined synchronization word (or synchronization sequence), followed by a formatted transmission packet including a header, useful data and an error detector code. This bitstream is transformed into an electrical signal that controls the activation or deactivation of the light source, at a frequency chosen so that the flicker caused is imperceptible to the human eye. For example, when the light source is switched on (high state of the corresponding light signal), a binary '1' is transmitted, and when the light source is switched off (low state of the corresponding light signal), a binary '0' is transmitted. Another correspondence between high and low states and transmitted bits could be implemented, without changing the principle of the method.

The receiver/decoder device applies digital image processing to the images acquired by the image sensor device in order to perform a demodulation of the modulated data and then a decoding in order to obtain decoded data.

The acquired digital images include matrices of pixels the values of which are representative, in a zone illuminated by the light source, of the high or low state of the light source, or of a transition between the states. Thereby, an acquired digital image includes a zone with light and dark fringes, corresponding to the high and low states, respectively, of the light signal.

Known systems are particularly suitable for VLC communication with emitters including powerful light sources with large surface area.

Within the framework of an application such as mentioned hereinabove, the products incorporating the light indicators or screens mentioned have a relatively small size, and the light sources have also small sizes, e.g. between 2 mm and 6 cm. When the transmission of data by VLC from such a product is envisaged, for reading the data by a portable electronic device, e.g. a mobile telephone such as a smartphone, an electronic tablet or a laptop computer, the zone of the acquired image representative of the light source occupies a variable surface area and decreases with the distance between the image sensor and the product considered.

FIG. 1 illustrates, as an example, images of a LED light source with a diameter of 2.5 mm captured at different distances, ranging from 2.5 mm to 5 cm, and in the image picked up at 2.5 mm, vertical fringes can be observed corresponding to the high and low states of the light source corresponding to the modulation values, and that the further the distance between the image sensor and the light source, the more the corresponding zone decreases in the image captured, being reduced to an almost point zone on an image background, potentially noisy. Thereby, the amount of background noise increases with distance, whereas the light intensity of the corresponding area decreases with distance, which may introduce errors in the demodulation and the decoding of the data.

There is thus a need to improve the demodulation of data modulated by amplitude modulation of a light signal emitted by a light source.

SUMMARY OF THE INVENTION

To this end, the invention proposes a method of demodulation of data modulated by amplitude modulation of a light signal emitted by a light source of an emitting device, the method including an acquisition of a digital image including a zone illuminated by said light signal, said zone including fringes corresponding to high and low states of the light signal. The method further includes the steps of:

- calculation of a mean value per column of said digital image, and storage of the mean values per column in association with a column index, arranged between a first edge index corresponding to a first edge of said image and a second edge index corresponding to a second edge of said image;
- determination of a maximum value of said mean values, and calculation of a threshold from said maximum value,
- determination of a first column index corresponding to the first mean value greater than or equal to said threshold starting from the first edge index, and of a second column index corresponding to the first mean value greater than or equal to said threshold starting from the second edge index;
- extraction of a subset of mean values between the first column index and the second column index;

demodulation of binary data from said subset of mean values.

Advantageously, the proposed method serves for a dynamic adaptation, without prior knowledge, for extracting and processing a zone of image corresponding to the light source. Thereby, advantageously, thereof makes it possible to improve the demodulation and the decoding while having a margin of positioning of the image sensor of the receiver device with respect to the light source.

The method of demodulation of data modulated by amplitude modulation according to the invention may have one or a plurality of the features hereinbelow, taken independently or according to all technically feasible combinations.

The threshold is a percentage of said maximum value, preferably comprised between 30% and 50%.

The threshold is equal to 40% of said maximum value.

In the storage step, the mean values per column are stored in a table or in a list ordered according to the column indices.

The binary data demodulation step includes a calculation of a thresholding curve using a segmentation method.

According to another aspect, the invention relates to a device for demodulating data modulated by amplitude modulation of a light signal emitted by a light source of an emitting device, the demodulation device being configured to acquire a digital image including a zone illuminated by said light signal, said zone including fringes corresponding to high and low states of the light signal. Such device further includes modules configured to:

- calculate an average value per column of said digital image, and store the average values per column in association with a column index, arranged between a first edge index corresponding to a first edge of said image and a second edge index corresponding to a second edge of said image;
- determine a maximum value of said mean values, and calculate a threshold from said maximum value,
- determine a first column index corresponding to the first mean value greater than or equal to said threshold starting from the first edge index, and of a second column index corresponding to the first mean value greater than or equal to said threshold starting from the second edge index;
- extract a subset of mean values between the first column index and the second column index;
- demodulate binary data from said subset of mean values.

In one embodiment, the threshold is a percentage of said maximum value, preferably comprised between 30% and 50%.

According to another aspect, the invention relates to an electronic apparatus including an image sensor and a demodulation device as briefly described hereinabove.

According to a particular feature, the electronic device is a mobile phone or an electronic tablet.

BRIEF DESCRIPTION OF THE DRAWINGS

Other features and advantages of the invention will be clear from the description thereof which is given below as a non-limiting example, with reference to the enclosed figures, among which.

DETAILED DESCRIPTION OF EMBODIMENTS

Figure 1:
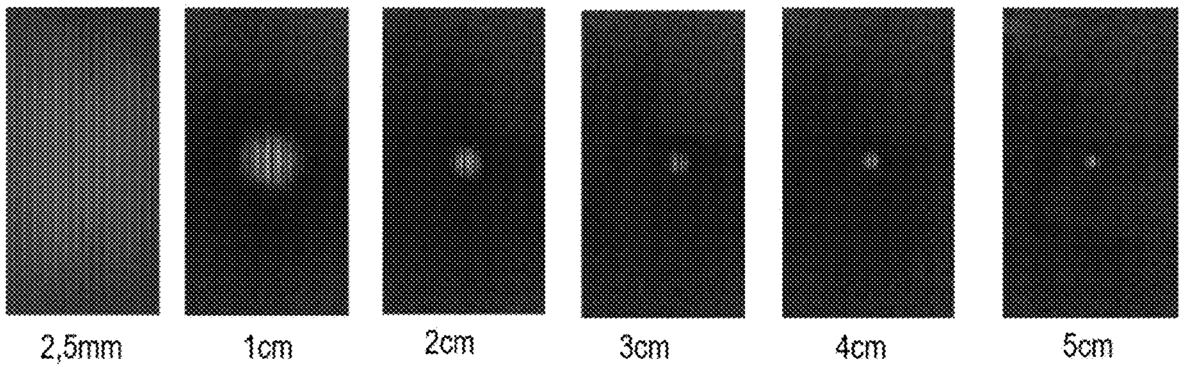
FIG. 1, already described, illustrates a plurality of images of the same light source captured at increasing distances.
Figure 2:
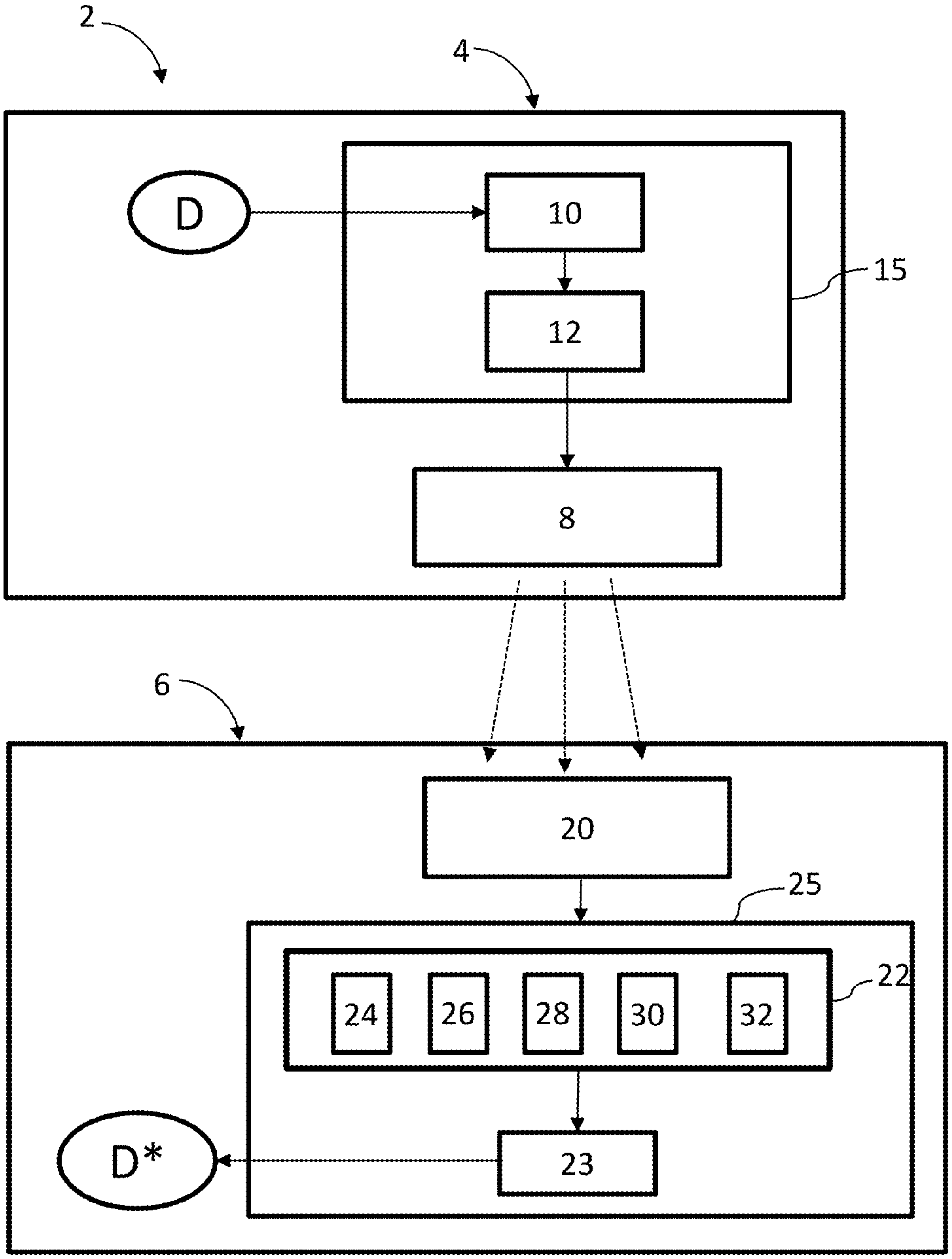
FIG. 2 is a schematic representation of a transmitter and of a receiver of a VLC system.

FIG. 2 illustrates a VLC system 2, including a transmitter device 4 in unidirectional communication with a receiver device 6.

The transmitter device 4, also simply called a transmitter, is configured to encode, modulate and transmit digital data D by using an amplitude modulation of a light signal emitted by a light source 8, e.g. formed by one or a plurality lamps, suitable for emitting wavelengths in the visible spectrum, the wavelength being comprised between 380 nm and 780 nm.

The transmitter 4 includes a coding module 10 and a modulation module 12, which controls the amplitude of a light signal emitted by the light source 8.

The coding module 10 implements e.g. a coding which consists in transforming bits into code words, also called symbols. In the VLC system 2, the coding module 10 implements Manchester coding and formatting in the form of transmission packets formatted according to a chosen protocol.

Manchester coding, according to IEEE standard 802.3, consists in coding a “1” by “01” and a “0” by “10”.

The symbols are then encapsulated in formatted transmission packets to form a bitstream comprising a predetermined synchronization word, followed by a formatted transmission packet comprising a header, useful data and error detection code.

For example, when Manchester coding is used, the synchronization word is the pattern ‘1111’ because by definition, said pattern is not part of Manchester code. In other words, no series of Manchester code symbols form a sequence of four ‘1’s.

The size of packets is variable, depending on the intended application. The size is indicated in the header of the packages.

The error detection code is e.g. a cyclic redundancy check code such as CRC8 or CRC16.

The modulation module 12 implements a modulation such as “On-Off Keying” (OOK). In said type of modulation, the light signal emitted by the light source is in the high state (i.e. light source on) to transmit a binary ‘1’ or in the low state (i.e. light source off) to transmit a ‘0’, with a frequency high enough to prevent the flicker from being visible to the human eye.

In one embodiment, the coding module 10 and the modulation module 12 are implemented by a calculating processor 15. For example, the processor is implemented by the transmitter device 4.

In a variant, each of the coding 10 and modulation 12 modules is a dedicated module produced in the form of a programmable logic component, such as an FPGA (Field Programmable Gate Array), or else in the form of a dedicated integrated circuit, such as an ASIC (Application Specific Integrated Circuit).

For example, the transmitter device 4 is integrated into an industrial product and the light source 8 includes one or a plurality of LED lamps, forming a light indicator initially intended to indicate an operating state of the industrial product. The light source is preferably integrated so as to illuminate a portion of a face of the industrial product, visible to a user when the industrial product is in the operating position, e.g. when the industrial product is fastened onto a support, the illuminated portion being located on the front face of the product.

The modulation of the emitted light signal is indistinguishable to the naked eye. Advantageously, the modulation of the light signal for transmitting additional digital data does not disturb the initial function of the light indicator of the industrial product.

For example, the digital data D include additional information relating to the industrial product, e.g. a unique identifier of the product, an IP (Internet Protocol) address or a URL (acronym for uniform Resource Locator or web address), a key or a code, the status of the registers, a BLE (acronym for Bluetooth Low Energy) coupling password or dynamic keys for the commissioning of Zigbee. More generally, the digital data D include information about commissioning or pairing wireless communication, measurements made by the product, and the state of the product. As a result e.g. the installation and the commissioning of a product, or the maintenance of a product by a user, are facilitated. As a result, the cybersecurity of a product is also improved.

The modulated light signal is emitted by the light source 8.

The receiver device 6, also referred to simply as a receiver, includes an image sensor 20, e.g. an optical camera with CMOS sensors (Complementary metal-oxide-semiconductor), suitable for picking up light signals in the form of a digital image, a digital image being composed of one or a plurality of matrices of pixels, each pixel of a matrix of pixels having an associated numerical value.

Preferably, the image sensor 20 is a «rolling-shutter» type sensor.

The image sensor 20 is configured to acquire images formed by the light signal emitted by the light source 8.

Depending on the calibration parameters of the image sensor 20, in particular the sensitivity (expressed in ISO or gain in dB), the exposure time and the acquisition time of an image (or frame), the acquired digital images include values representative of the high or low state, or of a transition between the states in an image zone illuminated by the light source. Thereby, an acquired digital image includes a zone with light and dark fringes, corresponding to the high and low states, respectively, of the light signal.

The acquired digital image is transmitted to a demodulation device 22, and the result of the demodulation device 22 is transmitted to a decoding module 23 so as to obtain at output a set of decoded digital data D*.

In the absence of loss or error, the decoded digital data D* are identical to the digital data D.

In one embodiment, the demodulation device 22 and the decoding module 23 are implemented by a calculating processor 25.

In a variant, each of the demodulation 22 and coding 23 modules is a dedicated module produced in the form of a programmable logic component, such as an FPGA (Field Programmable Gate Array), or else in the form of a dedicated integrated circuit, such as an ASIC (Application Specific Integrated Circuit).

In one embodiment, the receiver device 6 is a portable electronic device, such as a mobile phone or smartphone, an electronic tablet, a laptop computer, or any other portable electronic device equipped with a camera and an electronic computing device.

When the receiver device 6 is placed by a user in such a way that the image sensor 20 of the receiver device is placed substantially opposite the light source 8, at a distance from the light source 8 chosen by the user and e.g. lying in the range 0 cm (i.e. glued together) to 6 cm, and the receiver device 6 is placed in a VLC reception mode, the or each image captured comprises, in a zone illuminated by the light signal emitted by the light source, fringes, arranged vertically, representative of the high and low states of the signal emitted.

Thereby, wireless data transmission takes place between the transmitter 4 and the receiver 6, using VLC.

The demodulation device 22 is an electronic computing device implementing the method of demodulation of data modulated by amplitude modulation of a light signal emitted by the light source 8 of the transmitter device 4.

In one embodiment, the demodulation device 22 includes:

- a module 24 configured to calculate an average value per column of said digital image, and store the average values per column in association with a column index, arranged between a first edge index corresponding to a first edge of said image and a second edge index corresponding to a second edge of said image;
- a module 26 configured to determine a maximum value of said mean values, and calculate a threshold from said maximum value,
- a module 28 configured to determine a first column index corresponding to the first mean value greater than or equal to said threshold starting from the first edge index, and of a second column index corresponding to the first mean value greater than or equal to said threshold starting from the second edge index;
- a module 30 configured to extract a subset of mean values between the first column index and the second column index;
- a module 32 configured to demodulate binary data from said subset of mean values.

Preferably, the modules 24, 26, 28, 30, 32 are implemented in the form of software instructions forming a computer program which, when executed by a calculating processor 25, execute the modulated data demodulation method as described hereinafter. The software code is stored in an electronic memory of the receiver device 6.

When the method is produced in the form of one or a plurality of software programs, i.e. in the form of a computer program, same is further apt for being recorded on a computer-readable medium (not shown). The computer-readable medium is e.g. a medium apt to store the electronic instructions and to be coupled to a bus of a computer system. As an example, the readable medium is an optical disk, a magneto-optical disk, a ROM, a RAM, any type of non-volatile memory (e.g. FLASH or NVRAM) or a magnetic card. A computer program containing software instructions is then stored on the readable medium.

In a variant, each of the modules 24, 26, 28, 30, 32 is a dedicated module produced in the form of a programmable logic component, such as an FPGA (Field Programmable Gate Array), or else in the form of a dedicated integrated circuit, such as an ASIC (Application Specific Integrated Circuit).

Figure 3:
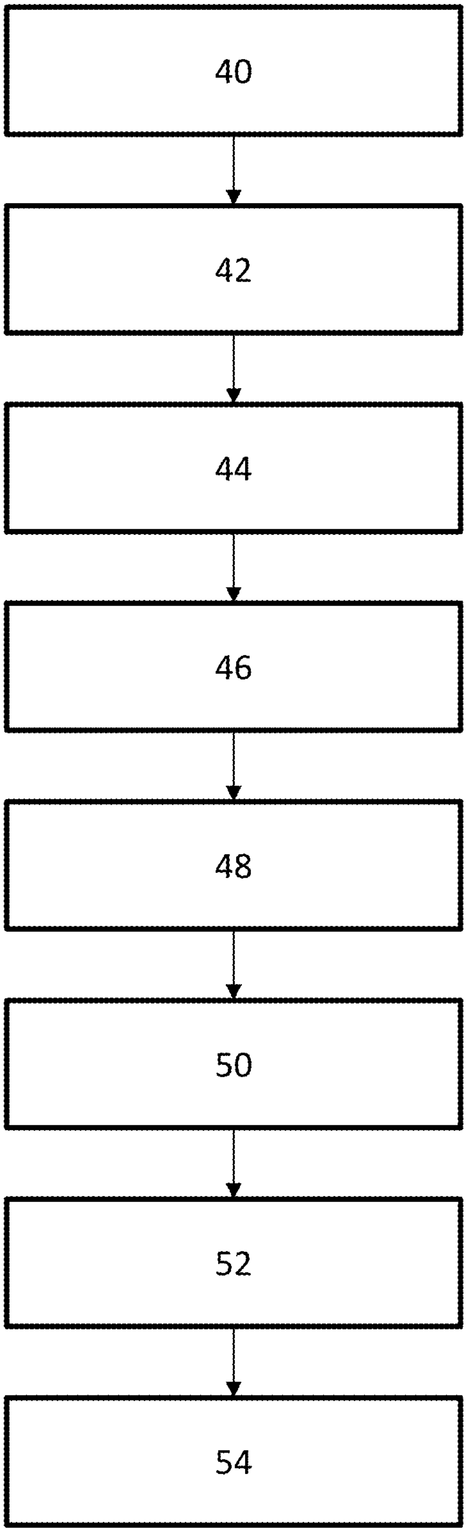
FIG. 3 is a flow chart of the steps of a demodulation method according to the invention.

FIG. 3 is a flow chart of the main steps of an embodiment of a method of demodulation of data modulated by amplitude modulation of a light signal emitted by a light source of a transmitter device.

The method comprises a step 40 of acquiring a digital image, including a zone illuminated by the light source, the zone including fringes corresponding to high and low states of the light signal, and fringes corresponding to a transition between the states.

The acquired digital image is a grayscale image, corresponding to the luminance of the light signal. Same is formed by a matrix of pixels, each pixel having a value representative of an associated grayscale. For example, each pixel takes a value coded on 8 or 16 bits.

For example, when the luminance is coded on 256 levels of gray, the light fringes correspond to a high state of the light signal, and the dark fringes correspond to a low state of the light signal, and the gray fringes correspond to the transitions between the states.

The method then comprises a step 42 of calculating a mean value per column of the digital image (i.e. calculating an average value of the luminance values per column), and of storing the mean values calculated in association with a column index.

For example, the calculated mean values are stored in a table or in an ordered list of values, the list being ordered according to the column indices. The calculated mean values form a signal S1 in one dimension (or signal 1D) representative of the columns of the digital image.

Figure 4:
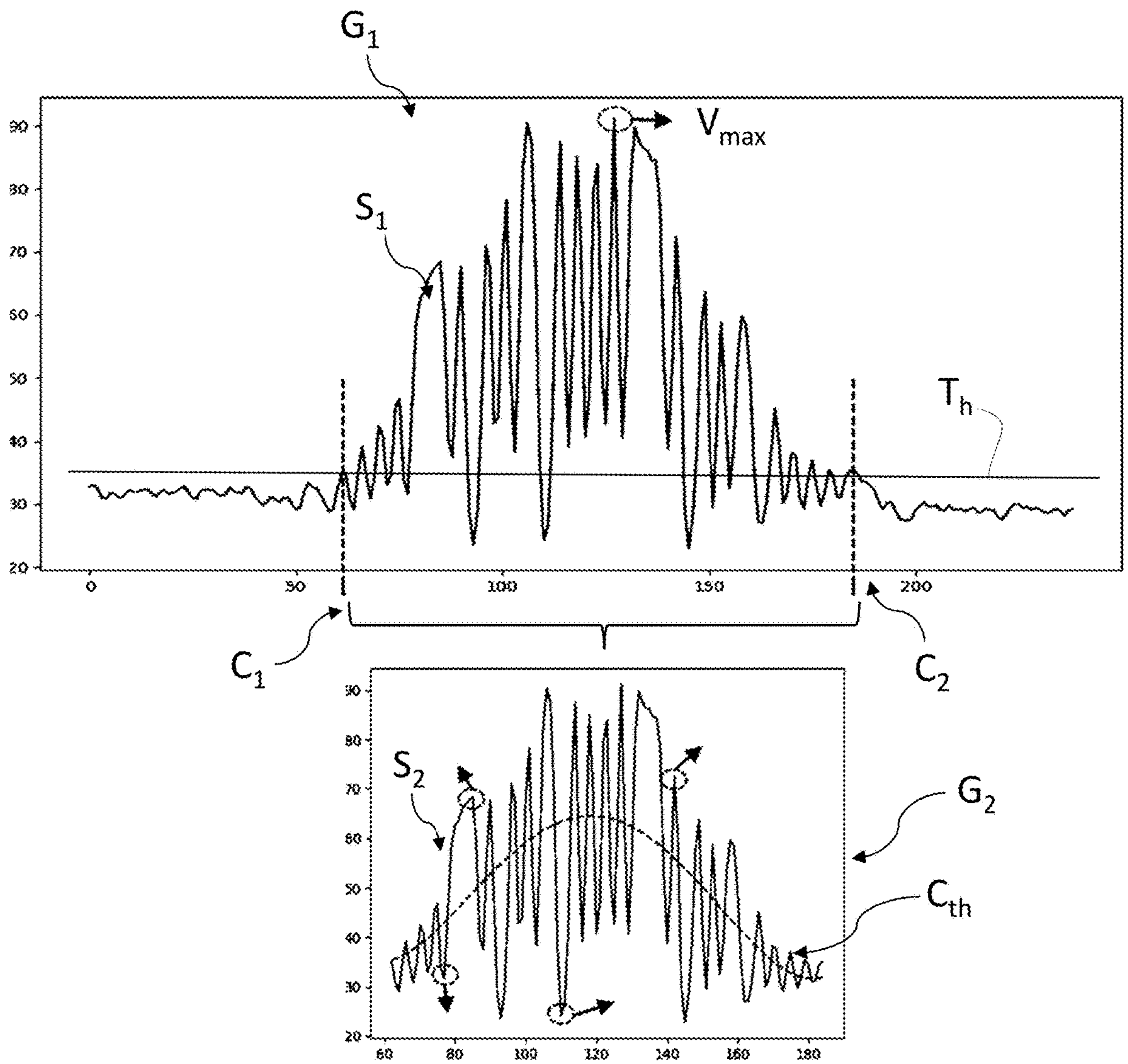
FIG. 4 illustrates examples of one-dimensional signals corresponding to mean values per column of a digital image acquired by a receiver.

The signal S1 thereby formed is illustrated in graph G1 of FIG. 4, which represents column index values on the abscissa and calculated mean values on the ordinate.

For a digital image including N columns, the column indices are integer indices lying between a first edge index, e.g. i=0, corresponding to a first edge of the acquired digital image and a second edge index, e.g. i=N−1, corresponding to a second edge of the acquired digital image. In other words, the first edge is a first vertical edge of the digital image, and the second edge is the second vertical edge, parallel to the first edge.

The method then includes a step 44 of determining the maximum value $V_{max}$ of the calculated and stored mean values, and a step 46 of calculating a threshold th from the maximum value $V_{max}$.

Preferably, the threshold Th is equal to a percentage of $V_{max}$, e.g. 40% of $V_{max}$.

More generally, the threshold Th is equal to a percentage P % of $V_{max}$ comprised between 30% and 50%.

The threshold Th is also stored.

The method then comprises a step 48 of determining a first column index, $c_1$, corresponding to the first mean value greater than or equal to the threshold Th starting from the first edge index and following the column indices in the increasing direction, and of determining a second column index, $c_2$, corresponding to the first mean value greater than or equal to the threshold Th starting from the second edge index and following the column indices in the decreasing direction.

In other words, the second index corresponds to the last mean value greater than or equal to the threshold Th of the stored signal 1D, by following the indices in the increasing direction.

Thereby, all the values of the samples of the signal S1 (mean value signal) lying between 0 (first edge index) and $c_1-1$ and all the values of the signal S1 lying between $c_2+1$ and N−1 (second edge index) are below the threshold Th.

A subset of mean values, forming a sub-signal S2, is then extracted during the extraction step 50, the sub-signal S2 being formed of mean values between the first column index $c_1$ and the second column index $c_2$.

The sub-signal S2 is represented in the graph G2 shown in FIG. 4.

Advantageously, the sub-signal S2 corresponds to the zone actually illuminated by the light source.

Advantageously, the method serves to dynamically adapt the size of the sub-signal S2 without prior knowledge of the size (e.g. the diameter) of the light source and of the distance between the image sensor and the light source. Thereby, spurious, potentially noisy values corresponding to the (non-illuminated) background of the image are eliminated automatically.

The method then comprises a demodulation of binary data from the subset of mean values extracted during step 50.

In one embodiment, the demodulation takes place in two steps, a step 52 of calculating a thresholding curve by a segmentation method, and a step 54 of extracting binary data by applying the thresholding curve to each column of the digital image, respectively.

In one embodiment, the segmentation method for calculating the thresholding curve is a polynomial curve fitting approximation.

The calculated thresholding curve Cth is illustrated in graph G2 of FIG. 4.

For each column index, if the mean value is above the corresponding point of the thresholding curve, a binary value equal to 1 is extracted, and if the mean value is below the point of the thresholding curve, a binary value equal to 0 is extracted.

The invention was described hereinabove in the context of a vertical orientation of the fringes observed in the digital image. The orientation is related to the direction of observation of the digital image picked up. It is clear that it is easy for a person skilled in the art to transpose the method described for an application for digital images including horizontal fringes.

Advantageously, the method serves to extract binary data from an illuminated zone of the digital image, by dynamic adaptation, and thus the image background, potentially noisy, is not used in the demodulation step. The precision of the demodulation is thereby increased.

Advantageously, the modulation of the light signal for transmitting additional digital data does not disturb the initial function of the light indicator of the industrial product. Thereby, it is possible to integrate the proposed function without requiring major structural changes to existing products, which limits the costs.

The invention claimed is:

1. A method of demodulation of data modulated by amplitude modulation of a visible light signal emitted by a light source of an emitting device, the method including an acquisition of a digital image including a zone illuminated by said visible light signal, the digital image being captured by an image sensor with a rolling shutter, said zone including fringes corresponding to high and low states of the light signal, the method comprising:

calculating an average luminance value per column of said digital image, and storing of the average values per column in association with a column index, arranged between a first edge index corresponding to a first edge of said image and a second edge index corresponding to a second edge of said image;

determining a maximum value of said average values, and calculation of a threshold from said maximum value, determining a first column index corresponding to a first average value greater than or equal to said threshold starting from the first edge index, and of a second column index corresponding to the first average value greater than or equal to said threshold starting from the second edge index;

extracting a subset of average values between the first column index and the second column index;

demodulating binary data from said subset of average values.

2. The method according to claim 1, wherein said threshold is a percentage of said maximum value, preferably comprised between 30% and 50%.

3. The method according to claim 2, wherein said threshold is equal to 40% of said maximum value.

4. The method according to claim 1, wherein in the storage step, the average values per column are stored in a table or in list ordered according to the column indices.

5. The method according to claim 1, wherein the step of binary data demodulation includes a calculation of a thresholding curve by a segmentation method.

6. A device of demodulation of data modulated by amplitude modulation of a visible light signal emitted by a light source of a transmitter device, the demodulation device being configured to acquire a digital image including a zone illuminated by said visible light signal, the digital image being captured by an image sensor with a rolling shutter, said zone including fringes corresponding to high and low states of the light signal, the device comprising modules configured for:

calculating an average luminance value per column of said digital image, and storing of the average values per column in association with a column index, arranged between a first edge index corresponding to a first edge of said image and a second edge index corresponding to a second edge of said image;

determining a maximum value of said average values, and calculate a threshold from said maximum value, determining a first column index corresponding to a first average value greater than or equal to said threshold starting from the first edge index, and of a second column index corresponding to the first average value greater than or equal to said threshold starting from the second edge index;

extracting a subset of average values between the first column index and the second column index;

demodulating binary data from said subset of average values.

7. The demodulation device according to claim 6, wherein said threshold is a percentage of said maximum value, preferably comprised between 30% and 50%.

8. An electronic apparatus including an image sensor with a rolling shutter and a device for demodulating data modulated by amplitude modulation of a light signal according to claim 6.

9. The electronic apparatus according to claim 8, said electronic apparatus being a mobile phone or an electronic tablet with at least one integrated CMOS image sensor apparatus.

* * * * *